US012093343B1

(12) United States Patent
Zhang et al.

(10) Patent No.: US 12,093,343 B1
(45) Date of Patent: Sep. 17, 2024

(54) ANALYSIS METHOD FOR DETERMINING GAS-BEARING SITUATION OF UNKNOWN SHALE RESERVOIR

(71) Applicants: Southwest Petroleum University, Chengdu (CN); China University of Geosciences, Wuhan, Wuhan (CN); University of Electronic Science and Technology of China, Chengdu (CN)

(72) Inventors: Kun Zhang, Chengdu (CN); Shu Jiang, Wuhan (CN); Pei Liu, Chengdu (CN); Xuri Huang, Chengdu (CN); Xiangyu Fan, Chengdu (CN); Hong Liu, Chengdu (CN); Hu Zhao, Chengdu (CN); Jun Peng, Chengdu (CN); Xiong Ding, Chengdu (CN); Lei Chen, Chengdu (CN); Xuefei Yang, Chengdu (CN); Bin Li, Chengdu (CN); Binsong Zheng, Chengdu (CN); Jinhua Liu, Chengdu (CN); Fengli Han, Chengdu (CN); Xueying Wang, Chengdu (CN); Xinyang He, Chengdu (CN); Xuejiao Yuan, Chengdu (CN); Jingru Ruan, Chengdu (CN); Hengfeng Gou, Chengdu (CN); Yipeng Liu, Chengdu (CN)

(73) Assignees: Southwest Petroleum University, Chengdu (CN); China University of Geosciences, Wuhan, Wuhan (CN); University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/592,581

(22) Filed: Mar. 1, 2024

(30) Foreign Application Priority Data

Mar. 2, 2023 (CN) .......................... 2023101916847

(51) Int. Cl.
*G06F 17/18* (2006.01)
*E21B 49/00* (2006.01)

(52) U.S. Cl.
CPC .............. *G06F 17/18* (2013.01); *E21B 49/00* (2013.01); *E21B 2200/20* (2020.05)

(58) Field of Classification Search
CPC ....... E21B 49/00; E21B 2200/20; G06F 17/18
See application file for complete search history.

(56) References Cited

FOREIGN PATENT DOCUMENTS

CN     101806215 A   *   8/2010
CN     104343445 A   *   2/2015     ............. E21B 49/00
(Continued)

OTHER PUBLICATIONS

CNIPA, Notification of First Office Action for CN202310191684.7, Dec. 5, 2023.

(Continued)

*Primary Examiner* — John C Kuan
(74) *Attorney, Agent, or Firm* — Zhigang Ma

(57) ABSTRACT

Provided is an analysis method for determining gas-bearing situation of an unknown shale reservoir, includes: S1, selecting a shale reservoir of a target interval of a place; and collecting data of parameters of cores of each of a known gas-bearing shale reservoir A and a known water-bearing shale reservoir B; S2, calculating average values of the parameters of each of the reservoirs A and B respectively; S3, calculating average differences of the parameters of each of the reservoirs; S4, calculating covariance values of the parameters of each of the reservoirs; S5, establishing, according to the covariance values, an equation group and resolving discriminant coefficients; S6, establishing a discriminant equation according to the discriminant coefficients and solving a discriminant index; and S7, obtaining values of parameters of cores of a sample of the unknown shale (Continued)

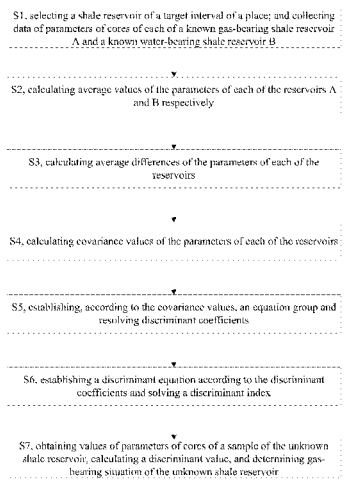

reservoir, calculating a discriminant value, and determining gas-bearing situation of the unknown shale reservoir.

4 Claims, 1 Drawing Sheet

(56) References Cited

FOREIGN PATENT DOCUMENTS

| | | | |
|---|---|---|---|
| CN | 113449261 A | * | 9/2021 |
| CN | 115680639 A | * | 2/2023 |
| KR | 20190071289 A | * | 6/2019 |

OTHER PUBLICATIONS

Southwest petroleum university and University of Electronic Science and Technology of China (Applicants), Reply to Notification of First Office Action for CN202310191684.7, w/ (allowed) replacement claims, Dec. 21, 2023.

CNIPA, Notification to grant patent right for invention in CN202310191684.7, Feb. 7, 2024.

* cited by examiner

S1, selecting a shale reservoir of a target interval of a place; and collecting data of parameters of cores of each of a known gas-bearing shale reservoir A and a known water-bearing shale reservoir B

↓

S2, calculating average values of the parameters of each of the reservoirs A and B respectively

↓

S3, calculating average differences of the parameters of each of the reservoirs

↓

S4, calculating covariance values of the parameters of each of the reservoirs

↓

S5, establishing, according to the covariance values, an equation group and resolving discriminant coefficients

↓

S6, establishing a discriminant equation according to the discriminant coefficients and solving a discriminant index

↓

S7, obtaining values of parameters of cores of a sample of the unknown shale reservoir, calculating a discriminant value, and determining gas-bearing situation of the unknown shale reservoir

ANALYSIS METHOD FOR DETERMINING GAS-BEARING SITUATION OF UNKNOWN SHALE RESERVOIR

TECHNICAL FIELD

The disclosure relates to the field of oil and gas field development technologies, particularly to an analysis method for determining gas-bearing situation of an unknown shale reservoir.

BACKGROUND

With the continuous development of oil and gas exploration and development technologies, oil and gas storage situation is becoming more and more complicated. In view of the complex geological conditions, hidden shapes and great vertical and horizontal changes of lithologic reservoirs, it is difficult to distinguish unknown rock reservoirs, the unknown rock reservoirs are rock reservoirs whose categories are unknown. In the current unconventional oil and gas analysis and exploration, it is difficult to distinguish the gas-bearing situation of the unknown shale reservoirs (whose categories are unknown) accurately.

In the related art, most methods for determining whether a shale reservoir is a water-bearing shale reservoir or a gas-bearing shale reservoir adopt the following steps: selecting several samples of a corresponding reservoir, sorting and screening the samples, and sending the samples for verification. Finally, a verification mechanism or a machine determines its category of the reservoir. However, in this case, there are related problems such as long time consumption, long energy consumption, and high cost. Even though the most methods can ensure the accuracy of the results, its cost and energy are increased. That is to say, in the related art, to accurately determining the gas-bearing situation, it needs to consume labor, cost, and technology, which results low efficiency and high cost. Therefore, in order to determining gas-bearing situation of an unknown shale reservoir, a mathematical method with high efficiency and low cost is needed.

SUMMARY

Aiming at the problems of poor accuracy, low efficiency, and high cost of the existing technical method for determining gas-bearing situation of an unknown shale reservoir, the disclosure provides an efficient and low-cost analysis method for accurately determining the gas-bearing condition.

The analysis method of the disclosure is a multivariate statistical analysis method, which establishes a quantitative relationship (discriminant function) between population and sample variables according to observations of groups of samples taken from known populations, and determines a category of an unknown generic sample according to the quantitative relationship. Through classification discriminant analysis, based on training sample data of a known gas-bearing shale reservoir and a known non-gas-bearing shale reservoir, a discriminant criterion is established by using the training sample data, and multiple groups of known observation values (m parameter variables) from multiple populations are collected by predicting variables, and then a discriminant function is established according to the known training sample data, and a category of an unknown reservoir sample is discriminated by using the discriminant function, so as to determine the gas-bearing situation of the unknown shale reservoir.

In an embodiment of the disclosure, an analysis method for determining gas-bearing situation of an unknown shale reservoir includes the following steps:

S1, selecting a shale reservoir of a target interval of a place; collecting cores of each of a known gas-bearing shale reservoir A and a known water-bearing shale reservoir B of the shale reservoir, where a total number of the collected cores of the known gas-bearing shale reservoir A is $n_a$, and a total number of the collected cores of the known water-bearing shale reservoir B is $n_b$; and obtaining values of parameters of each of the collected cores of each of the known gas-bearing shale reservoir A and the known water-bearing shale reservoir B, where the parameters include: a core porosity $\Phi$, a core permeability K, and a gas saturation $S_g$, S2, calculating average values of the parameters of the collected cores of the known gas-bearing shale reservoir A and average values of the parameters of the collected cores of the known water-bearing shale reservoir B respectively according to formulas (1) and (2), expressed as follows:

$$\bar{x}_n(A) = \frac{1}{n_a}\sum_{j=1}^{n_a} x_{nj}(A)(n=1,2,\ldots,m) \tag{1}$$

$$\bar{x}_n(B) = \frac{1}{n_b}\sum_{j=1}^{n_b} x_{nj}(B)(n=1,2,\ldots,m), \tag{2}$$

where $\bar{x}_n(A)$ represents an average value of an n-th typed parameter of the parameters of the collected cores of the known gas-bearing shale reservoir A; $\bar{x}_n(B)$ represents an average value of an n-th typed parameter of the parameters of the collected cores of the known water-bearing shale reservoir B; m represents a type number of the parameters of each of the collected cores of each of the known gas-bearing shale reservoir A and the known water-bearing shale reservoir B, the parameters of each of the collected cores of each of the known gas-bearing shale reservoir A and the known water-bearing shale reservoir B are numbered as 1, 2, ..., m in turn, and a value of n depends on the type number of the parameters; $x_{nj}(A)$ represents a value of an n-th typed parameter of a j-th core of the collected cores of the known gas-bearing shale reservoir A; and $x_{nj}(B)$ represents a value of an n-th typed parameter of a j-th core of the collected cores of the known water-bearing shale reservoir B;

S3, calculating average differences between the parameters of the collected cores of the known gas-bearing shale reservoir A and the parameters of the collected cores of the known water-bearing shale reservoir B according to a formula (3) as follows:

$$d_n = \bar{x}_n(A) - \bar{x}_n(B)(n=1,2,\ldots,m) \tag{3}$$

S4, calculating covariance values between the parameters of the collected cores of the known gas-bearing shale reservoir A and the parameters of the collected cores of the known water-bearing shale reservoir B according to a formula (4) as follows:

$$s_{ik} = \sum_{j=1}^{n_a}[x_{ij}(A) - \bar{x}_i(A)][x_{kj}(A) - \bar{x}_k(A)] + \tag{4}$$

-continued $$\sum_{j=1}^{n_b} [x_{ij}(B) - \bar{x}_i(B)][x_{kj}(B) - \bar{x}_k(B)],$$

where $s_{ik}$ represents a covariance value between one parameter of the parameters of the collected cores of the known gas-bearing shale reservoir A and one parameter of the parameters of the collected cores of the known water-bearing shale reservoir B; $x_{ij}(A)$ represents a j-th value of an i-th typed parameter of the parameters of the collected cores of the known gas-bearing shale reservoir A; $x_{kj}(A)$ represents a j-th value of a k-th typed parameter of the parameters of the collected cores of the known gas-bearing shale reservoir A; $\bar{x}_i(A)$ and $\bar{x}_k(A)$ respectively represent an average value of the i-th typed parameter of the parameters of the collected cores of the known gas-bearing shale reservoir A and an average value of the k-th typed parameter of the parameters of the collected cores of the known gas-bearing shale reservoir A; $x_{ij}(B)$ represents a j-th value of an i-th typed parameter of the parameters of the collected cores of the known gas-bearing shale reservoir B; $x_{kj}(B)$ represents a j-th value of a k-th typed parameter of the parameters of the collected cores of the known gas-bearing shale reservoir B; $\bar{x}_i(B)$ and $\bar{x}_k(B)$ respectively represent an average value of the i-th typed parameter of the parameters of the collected cores of the known gas-bearing shale reservoir B and an average value of the k-th typed parameter of the parameters of the collected cores of the known gas-bearing shale reservoir B;

S5, establishing, according to the covariance value $s_{ik}$ obtained in the S4, the following equation group (5), and resolving discriminant coefficients $c_1, c_1, \ldots, c_m$ based on the equation group (5):

$$\begin{cases} s_{11}c_1 + s_{12}c_2 + s_{13}c_3 + \ldots + s_{1m}c_m = d_1 \\ s_{21}c_1 + s_{22}c_2 + s_{23}c_3 + \ldots + s_{2m}c_m = d_2 \\ s_{31}c_1 + s_{32}c_2 + s_{33}c_3 + \ldots + s_{3m}c_m = d_3 \\ \ldots \ldots \\ s_{m1}c_1 + s_{m2}c_2 + s_{m3}c_3 + \ldots + s_{mm}c_m = d_m \end{cases} \quad (5)$$

S6, establishing a discriminant equation according to the obtained discriminant coefficients, the discriminant equation is expressed as follows in a formula (6);

$$Y = c_1 x_1 + c_2 x_2 + \ldots + c_m x_m \quad (6),$$

where $x_1, x_2, \ldots, x_m$ represent values of parameters of a corresponding core, and Y represents a discriminant value of the corresponding core; and solving, according to the following formula (7), a discriminant index $Y_c$ for discriminating a reservoir to which the unknown shale reservoir belongs:

$$Y_c = \frac{n_a \bar{Y}(A) + n_b \bar{Y}(B)}{n_a + n_b}, \quad (7)$$

where $\bar{Y}(A)$ and $\bar{Y}(B)$ represent an average discriminant value of the known gas-bearing shale reservoir A and an average discriminant value of the known water-bearing shale reservoir B, respectively, which are calculated according to the formula (6); and formulas for calculating $\bar{Y}(A)$ and $\bar{Y}(B)$ are as follows:

$$\bar{Y}(A) = c_1 \bar{x}_1(A) + c_2 \bar{x}_2(A) + c_3 \bar{x}_3(A) + \ldots + c_m \bar{x}_m \quad (A)$$

$$\bar{Y}(B) = c_1 \bar{x}_1(B) + c_2 \bar{x}_2(B) + c_3 \bar{x}_3(B) + \ldots + c_m \bar{x} x_m \quad (B),$$

where $\bar{x}_m(A)$ represents an average value of an m-th typed parameter of the parameters of the collected cores of the known gas-bearing shale reservoir A, and $\bar{x}_m(B)$ represents an average value of an m-th typed parameter of the parameter of the collected cores of the known water-bearing shale reservoir B, which are calculated in the S2;

S7, obtaining values of relevant parameters of cores of a sample X of the unknown shale reservoir, where the relevant parameters include a core porosity Φ, a core permeability K and a gas saturation $S_g$; substituting the values of the relevant parameters into the formula (6) to calculate a discriminant value Y of a corresponding core of the cores of the sample X of the unknown shale reservoir; and in a situation of $Y \geq Y_c$, determining that the unknown reservoir belongs to a gas-bearing shale reservoir, or in a situation of $Y < Y_c$, determining that the unknown reservoir belongs to a water-bearing shale reservoir.

In an embodiment, the S6 further includes: after solving the discriminant index $Y_c$ for discriminating a reservoir to which the unknown shale reservoir belongs, verifying whether the discriminant index $Y_c$ is accurate based on the known gas-bearing shale reservoir A and the known water-bearing shale reservoir B.

In an embodiment, in S1, the obtained values of the parameters of each of the collected cores of each of the known gas-bearing shale reservoir A and the known water-bearing shale reservoir B are values of the core porosity Φ, the core permeability K, and the gas saturation $S_g$. Each of the parameters of each of the collected cores of each of the known gas-bearing shale reservoir A and the known water-bearing shale reservoir B has at least five different values.

In an embodiment, the analysis method for determining the gas-bearing situation of the unknown shale reservoir further includes: providing the corresponding determination result of the unknown reservoir to exploration personnel, thereby, designing, by the exploration personnel, an exploration solution for the unknown reservoir based on the corresponding determination result of the unknown reservoir, and exploring the unknown reservoir based on the exploration solution.

Compared with the related art, the disclosure has at least the following beneficial effects.

According to the disclosure, different unknown shale reservoirs are analyzed by using a simple and quick mathematical method, i.e., a discriminant analysis mathematical method, as such, steps such as sample sending and checking are avoided. The method uses two known reservoirs, a gas-bearing shale reservoir A and a water-bearing shale reservoir B, to establish a discriminant analysis principle for a known shale reservoir sample and realize the analysis of unknown reservoirs, which can greatly reduce the cost of discriminant analysis and ensure the accuracy by using the mathematical method, and has strong practicability and universality.

Other advantages, objectives, and characteristics of the disclosure will be partly reflected in the following description, and partly understood by those skilled in the art through the study and practice of the disclosure.

BRIEF DESCRIPTION OF DRAWING

FIGURE illustrates a schematic flow chart of an analysis method for determining gas-bearing situation of an unknown shale reservoir according to an embodiment of the disclosure.

DETAILED DESCRIPTION OF EMBODIMENTS

Hereinafter, the exemplary embodiments of the disclosure will be described, and it should be understood that the exemplary embodiments described herein are merely used to illustrate and explain the disclosure, and are not used to limit the disclosure.

In the disclosure, a significance test and a sample discrimination method are adopted to determine whether a sample X belongs to a population A or a population B. In discriminant analysis, there is at least one group of training samples whose categories have been clearly known. With this data, i.e., the at least one group of training samples, a discriminant criterion can be established, and observations of unknown categories can be discriminated based on predicted variables. Based on this, it is simple to identify and determine whether an unknown shale reservoir is a gas-bearing shale reservoir or a water-bearing shale reservoir, thereby increasing accuracy and convenience.

Application Example

A shale reservoir of a target interval in a certain place of Sichuan is selected, existing shale reservoir data from the target interval is collected for discriminant analysis, and whether a sample X is a gas-bearing shale reservoir A or a water-bearing shale reservoir B of two populations is determined.

Specifically, the analysis method includes the following steps S1-S7, as illustrated in FIGURE.

In S1, a shale reservoir of a target interval in a certain place of Sichuan is selected, existing shale reservoir data from the target interval is collected for discriminant analysis. Five different cores are collected from each of the gas-bearing shale reservoir A and the water-bearing shale reservoir B, and an analyzing process is performed on each of the cores to obtain data values including a core porosity $\Phi$, a core permeability K and a gas saturation $S_g$ of the core. The data analysis of three parameters of the five cores of each of the known gas-bearing shale reservoir A and the known water-bearing shale reservoir B are shown in Table 1.

TABLE 1

Core analysis data of the known gas-bearing shale reservoir A and the known water-bearing shale reservoir B

| | Number of 5 cores (j) | $x_{1j}(A)$ Core porosity $\Phi(\%)$ | $x_{2j}(A)$ Core permeability $K(\times 10^{-3} um^2)$ | $x_{3j}(A)$ Gas saturation $S_g(\%)$ |
|---|---|---|---|---|
| Known gas-bearing shale reservoir A | 1 | 8.37 | 0.19 | 70.28 |
| | 2 | 11.85 | 5.74 | 87.23 |
| | 3 | 10.92 | 0.98 | 67.91 |
| | 4 | 9.28 | 0.88 | 77.64 |
| | 5 | 6.82 | 0.57 | 60.87 |

TABLE 1-continued

Core analysis data of the known gas-bearing shale reservoir A and the known water-bearing shale reservoir B

| | Number of 5 cores (j) | $x_{1j}(B)$ Core porosity $\Phi(\%)$ | $x_{2j}(B)$ Core permeability $K(\times 10^{-3} um^2)$ | $x_{3j}(B)$ Gas saturation $S_g(\%)$ |
|---|---|---|---|---|
| Known water-bearing shale reservoir B | 1 | 8.05 | 0.78 | 10.88 |
| | 2 | 9.28 | 0.45 | 17.31 |
| | 3 | 13.87 | 0.56 | 11.01 |
| | 4 | 9.37 | 0.98 | 2.79 |
| | 5 | 15.27 | 1.95 | 18.02 |

In S2, average values of the group of core porosities $\Phi$, the group of core permeabilities K and the group of gas saturations $S_g$ of each of the gas-bearing shale reservoir A and the water-bearing shale reservoir B are calculated, and calculation results are as follows:

$$\bar{x}_1(A) = \frac{1}{n_1}\sum_{j=1}^{n_1} x_{1j}(A) = 9.448 \quad \bar{x}_2(A) = \frac{1}{n_1}\sum_{j=1}^{n_1} x_{2j}(A) = 1.672$$

$$\bar{x}_3(A) = \frac{1}{n_1}\sum_{j=1}^{n_1} x_{3j}(A) = 72.786 \quad \bar{x}_1(B) = \frac{1}{n_2}\sum_{j=1}^{n_2} x_{1j}(B) = 11.168$$

$$\bar{x}_2(B) = \frac{1}{n_2}\sum_{j=1}^{n_2} x_{2j}(B) = 0.944 \quad \bar{x}_3(B) = \frac{1}{n_2}\sum_{j=1}^{n_2} x_{3j}(B) = 12.002$$

In S3, an average difference between the group of core porosities $\Phi$ of the gas-bearing shale reservoir A and the group of core porosities $\Phi$ of the water-bearing shale reservoir B, an average difference between the group of core permeabilities K of the gas-bearing shale reservoir A and the group of core permeabilities K of the water-bearing shale reservoir B, and an average difference between the group of gas saturations $S_g$ of the gas-bearing shale reservoir A and the group of gas saturations $S_g$ of the water-bearing shale reservoir B are calculated, and calculation results are as follows:

$$d_1 = \bar{x}_1(A) - \bar{x}_1(B) = -1.92$$

$$d_2 = \bar{x}_2(A) - \bar{x}_2(B) = 0.728$$

$$d_3 = \bar{x}_3(A) - \bar{x}_3(B) = 60.754$$

In S4, covariance values between the group of core porosities $\Phi$, the group of core permeabilities K and the group of gas saturations $S_g$ of each of the gas-bearing shale reservoir A and the water-bearing shale reservoir B are calculated, and calculation results are as follows:

$$s_{11} = \sum_{j=1}^{5}[x_{1j}(A) - \bar{x}_1(A)]^2 + \sum_{j=1}^{5}[x_{1j}(B) - \bar{x}_1(B)]^2 = 61.59$$

$$s_{12} = \sum_{j=1}^{5}[x_{1j}(A) - \bar{x}_1(A)][x_{2j}(A) - \bar{x}_2(A)] + \sum_{j=1}^{5}[x_{1j}(B) - \bar{x}_1(B)][x_{2j}(B) - \bar{x}_2(B)] = 17.848$$

$$s_{13} = \sum_{j=1}^{5}[x_{1j}(A) - \bar{x}_1(A)][x_{3j}(A) - \bar{x}_3(A)] + \sum_{j=1}^{5}[x_{1j}(B) - \bar{x}_1(B)][x_{3j}(B) - \bar{x}_3(B)] = 92.808$$

$$s_{22} = \sum_{j=1}^{5}[x_{2j}(A) - \bar{x}_2(A)]^2 + \sum_{j=1}^{5}[x_{2j}(B) - \bar{x}_2(B)]^2 = 22.497$$

$$s_{23} = \sum_{j=1}^{5}[x_{2j}(A) - \bar{x}_2(A)][x_{3j}(A) - \bar{x}_3(A)] + \sum_{j=1}^{5}[x_{2j}(B) - \bar{x}_2(B)][x_{3j}(B) - \bar{x}_3(B)] = 75.797$$

$$s_{33} = \sum_{j=1}^{5}[x_{3j}(A) - \bar{x}_3(A)]^2 + \sum_{j=1}^{5}[x_{3j}(B) - \bar{x}_3(B)]^2 = 555.734$$

In S5, an equation group is established according to the covariance values and the average differences, and discriminant coefficients are solved based on the equation group. The equation group is as follows:

$$\begin{cases} s_{11}c_1 + s_{12}c_2 + s_{13}c_3 = d_1 \\ s_{21}c_1 + s_{22}c_2 + s_{23}c_3 = d_2 \\ s_{31}c_1 + s_{32}c_2 + s_{33}c_3 = d_3 \end{cases}.$$

The covariance values and the average differences are substituted into the equation group to obtain a second equation group as follows:

$$\begin{cases} 61.59c_1 + 17.848c_2 + 92.808c_3 = -1.92 \\ 17.848c_1 + 22.497c_2 + 75.797c_3 = 0.728 \\ 92.808c_1 + 75.797c_2 + 555.734c_3 = 60.754 \end{cases}.$$

According to the second equation group, the discriminant coefficients are obtained as follows:

$c_1 = -0.201, c_2 = -0.536, c_3 = 0.216.$

In S6, a discriminant equation is established according to the obtained discriminant coefficients, and a discriminant index $Y_c$ is solved based on the discriminant equation:

$Y = -0.201x_1 - 0.536x_2 + 0.216x_3$ $\bar{Y}(A) = c_1\bar{x}_1(A) + c_2\bar{x}_2(A) + c_3\bar{x}_3(A)$ $= -0.201 \times 9.448 - 0.536 \times 1.672 + 0.216 \times 72.786 = 12.9351$ $\bar{Y}(B) = -c_1\bar{x}_1(B) + c_2\bar{x}_2(B) + c_3\bar{x}_3(B)$ $= -0.201 \times 11.168 - 0.536 \times 0.944 + 0.216 \times 12.002 = -0.1583$ $Y_c = \dfrac{n_1\bar{Y}(A) + n_2\bar{Y}(B)}{n_1 + n_2} = \dfrac{5 \times 12.9351 + 5 \times (-0.1583)}{5 + 5} = 6.3884$ In a situation of $Y \geq Y_c = 6.3884$, the shale reservoir is a gas-bearing shale reservoir; In a situation of $Y < Y_c = 6.3884$, the shale reservoir is a water-bearing shale reservoir.

Here, the known gas-bearing shale reservoir A and water-bearing shale reservoir B are used for verification, $Y_c = 6.3884$. Values of $Y^*(A)$ and $Y^*(B)$ calculated by verification are shown in Table 2.

TABLE 2

Calculated values obtained using the known gas-bearing shale reservoir A and the known water-bearing shale reservoir B for verification

| Number of 5 cores (j) | Gas-bearing shale reservoir A | | | |
|---|---|---|---|---|
| | $x_{1j}(A)$ | $x_{2j}(A)$ | $x_{3j}(A)$ | $Y^*(A)$ |
| 1 | 8.37 | 0.19 | 70.28 | 13.3972 |
| 2 | 11.85 | 5.74 | 87.23 | 13.3832 |
| 3 | 10.92 | 0.98 | 67.91 | 11.948 |
| 4 | 9.28 | 0.88 | 77.64 | 14.433 |
| 5 | 6.82 | 0.57 | 60.87 | 11.47 |

| Number of 5 cores (j) | Water-bearing shale reservoir B | | | |
|---|---|---|---|---|
| | $x_{1j}(B)$ | $x_{2j}(B)$ | $x_{3j}(B)$ | $Y^*(B)$ |
| 1 | 8.05 | 0.78 | 10.88 | 0.314 |
| 2 | 9.28 | 0.45 | 17.31 | 1.6325 |
| 3 | 13.87 | 0.56 | 11.01 | −0.71 |
| 4 | 9.37 | 0.98 | 2.79 | −1.806 |
| 5 | 15.27 | 1.95 | 18.02 | −0.222 |

In S7, two unknown shale reservoirs (unknown reservoir sample X1 and unknown reservoir sample X2) are analyzed. Five different cores are collected from each of the two unknown shale reservoirs, and an analyzing process is performed on each of the cores to obtain data including a core porosity Φ, a core permeability K and a gas saturation $S_g$ of the core. Statistics of five core analysis data of the unknown shale reservoir sample X1 are shown in Table 3. Statistics of five core analysis data of the unknown shale reservoir sample X2 are shown in Table 4.

TABLE 3

Core parameter data of the unknown reservoir sample X1

| | | Analysis data of unknown shale reservoir sample | | |
|---|---|---|---|---|
| | Number of 5 cores (j) | $x_{1j}(B)$ Core porosity Φ(%) | $x_{2j}(B)$ Core permeability ($\times 10^{-3}$ um$^2$) | $x_{3j}(B)$ Gas saturation $S_g$(%) |
| Unknown reservoir sample X1 | 1 | 11.52 | 3.32 | 80.02 |
| | 2 | 6.12 | 0.88 | 60.41 |
| | 3 | 5.51 | 1.28 | 23.01 |
| | 4 | 8.87 | 0.67 | 71.24 |
| | 5 | 4.38 | 0.51 | 81.17 |

TABLE 4

Core parameter data of the unknown reservoir sample X2

| | | Analysis data of unknown shale reservoir samples | | |
|---|---|---|---|---|
| | Number of 5 cores (j) | $x_{1j}(B)$ Core porosity $\Phi(\%)$ | $x_{2j}(B)$ Core permeability $(\times 10^{-3} \text{um}^2)$ | $x_{3j}(B)$ Gas saturation $S_g(\%)$ |
| Unknown reservoir sample X2 | 1 | 15.24 | 4.25 | 85.12 |
| | 2 | 13.04 | 2.14 | 67.58 |
| | 3 | 1.24 | 0.42 | 42.78 |
| | 4 | 8.97 | 1.57 | 74.97 |
| | 5 | 4.38 | 0.84 | 59.87 |

Values of parameters in tables 3 and 4 are substituted into the formula $Y=-0.201x_1-0.536x_2+0.216x_3$ and corresponding discriminant values Y are calculated. When $Y \geq Y_c=6.3884$, the corresponding core is the gas-bearing shale reservoir A; when $Y<Y_c=6.3884$, the corresponding core is the water-bearing shale reservoir B. The calculation and determination results are shown in Table 5 and Table 6.

TABLE 5

Calculation and determination results of the unknown reservoir sample X1
Unknown reservoir sample X1

| | | Analysis data of the unknown shale reservoir sample | | | |
|---|---|---|---|---|---|
| Number of 5 cores (j) | $x_{1j}$ (B) Core porosity $\Phi(\%)$ | $x_{2j}$ (B) Core permeability $K(\times 10^{-3} \text{um}^2)$ | $x_{3j}$ (B) Gas saturation $S_g(\%)$ | Discriminant value Y | Category |
| 1 | 11.52 | 3.32 | 80.02 | 13.189 | A |
| 2 | 6.12 | 0.88 | 60.41 | 11.347 | A |
| 3 | 5.51 | 1.28 | 23.01 | 3.177 | B |
| 4 | 8.87 | 0.67 | 71.24 | 13.246 | A |
| 5 | 4.38 | 0.51 | 81.17 | 16.379 | A |

TABLE 6

Calculation and determination results of the unknown reservoir sample X2
Unknown reservoir sample X2

| | | Analysis data of unknown shale reservoir samples | | | |
|---|---|---|---|---|---|
| Number of 5 cores (j) | $x_{1j}$ (B) Core porosity $\Phi(\%)$ | $x_{2j}$ (B) Core permeability $K(\times 10^{-3} \text{um}^2)$ | $x_{3j}$ (B) Gas saturation $S_g(\%)$ | Discriminant value Y | Category |
| 1 | 15.24 | 4.25 | 85.12 | 13.045 | A |
| 2 | 14.04 | 6.74 | 57.58 | 6.003 | B |
| 3 | 1.24 | 10.42 | 42.78 | 3.406 | B |
| 4 | 8.97 | 1.57 | 74.97 | 13.549 | A |
| 5 | 5.38 | 2.84 | 39.87 | 6.008 | B |

From this, categories of unknown reservoir samples X1 and X2 can be determined by the discriminant values, where X1 is a gas-bearing shale reservoir and X2 is a water-bearing shale reservoir. Specifically, for 5 cores of the unknown reservoir sample X1, see the table 5, most of the 5 cores, i.e., 4 cores of the 5 cores belong to the category A, therefore, it is determined that the unknown reservoir sample X1 belongs to a gas-bearing shale reservoir; similarly, for 5 cores of the unknown reservoir sample X2, see the table 6, most of the 5 cores, i.e., 3 cores of the 5 cores belong to the category B, therefore, it is determined that the unknown reservoir sample X2 belongs to a water-bearing shale reservoir.

To sum up, the method of the disclosure mainly uses the discriminant analysis method to carry out significance test and sample discrimination to determine whether the sample X belongs to the population A or B. In discriminant analysis, there is at least one group of training samples whose categories have been clearly known. With this data, i.e., the at least one group of training samples, a discriminant criterion can be established, and observations of unknown categories can be discriminated based on predicted variables. Based on this, it is simple to identify and determine whether an unknown shale reservoir is a gas-bearing shale reservoir or a water-bearing shale reservoir, thereby increasing accuracy and convenience. Further, this method has strong practicability, simple and convenient calculation operation, less labor and cost, no need to test each reservoir sample one by one, time-saving and labor-saving, and has strong practicability, universality and operability.

The above is only the exemplary embodiments of the disclosure, and it does not limit the disclosure in any form. Although the disclosure has been disclosed through the exemplary embodiments, the exemplary embodiments are not used to limit the disclosure. Any person familiar with this field can make some changes or modify the exemplary embodiments into equivalent embodiments by using the technical contents disclosed above without departing from the scope of the technical solutions of the disclosure. However, any simple modification, equivalent change and modification of the exemplary embodiments according to the technical solutions of the disclosure that does not deviate from the content of the technical solutions of the disclosure still falls within the scope of the technical solutions of the disclosure.

What is claimed is:

1. An analysis method for determining gas-bearing situation of an unknown shale reservoir, comprising the following steps:
    S1, selecting a shale reservoir of a target interval of a place; collecting cores of each of a known gas-bearing shale reservoir A and a known water-bearing shale reservoir B of the shale reservoir, wherein a total number of the collected cores of the known gas-bearing shale reservoir A is $n_a$, and a total number of the collected cores of the known water-bearing shale reservoir B is $n_b$; and obtaining values of parameters of each of the collected cores of each of the known gas-bearing shale reservoir A and the known water-bearing shale reservoir B, wherein the parameters comprise: a core porosity $\Phi$, a core permeability K, and a gas saturation $S_g$;
    S2, calculating average values of the parameters of the collected cores of the known gas-bearing reservoir A and average values of the parameters of the collected cores of the known water-bearing reservoir B respectively according to formulas (1) and (2), expressed as follows:

$$\bar{x}_n(A) = \frac{1}{n_a} \sum_{j=1}^{n_a} x_{nj}(A) \quad (n = 1, 2, \ldots, m) \quad (1)$$

$$\bar{x}_n(B) = \frac{1}{n_b} \sum_{j=1}^{n_b} x_{nj}(B) \quad (n = 1, 2, \ldots, m), \quad (2)$$

where $\bar{x}_n(A)$ represents an average value of an n-th typed parameter of the parameters of the collected cores of the known gas-bearing shale reservoir A; $\bar{x}_n(B)$ represents an average value of an n-th typed parameter of the parameters of the collected cores of the known water-bearing shale reservoir B; m represents a type number of the parameters of each of the collected cores of each of the known gas-bearing shale reservoir A and the known water-bearing shale reservoir B, the parameters of each of the collected cores of each of the known gas-bearing shale reservoir A and the known water-bearing shale reservoir B are numbered as 1, 2, . . . , m in turn, and a value of n depends on the type number of the parameters; $x_{nj}(A)$ represents a value of an n-th typed parameter of a j-th core of the collected cores of the known gas-bearing shale reservoir A; and $x_{nj}(B)$ represents a value of an n-th typed parameter of a j-th core of the collected cores of the known water-bearing shale reservoir B;

S3, calculating average differences between the parameters of the collected cores of the known gas-bearing shale reservoir A and the parameters of the collected cores of the known water-bearing shale reservoir B according to a formula (3) as follows:

$$d_n = \bar{x}_n(A) - \bar{x}_n(B)(n=1,2, \ldots, m) \quad (3);$$

S4, calculating covariance values between the parameters of the collected cores of the known gas-bearing shale reservoir A and the parameters of the collected cores of the known water-bearing shale reservoir B according to a formula (4) as follows:

$$s_{ik} = \sum_{j=1}^{n_a} [x_{ij}(A) - \bar{x}_i(A)][x_{kj}(A) - \bar{x}_k(A)] + \sum_{j=1}^{n_b} [x_{ij}(B) - \bar{x}_i(B)][x_{kj}(B) - \bar{x}_k(B)], \quad (4)$$

where $s_{ik}$ represents a covariance value between one parameter of the parameters of the collected cores of the known gas-bearing shale reservoir A and one parameter of the parameters of the collected cores of the known water-bearing shale reservoir B; $x_{ij}(A)$ represents a j-th value of an i-th typed parameter of the parameters of the collected cores of the known gas-bearing shale reservoir A; $x_{kj}(A)$ represents a j-th value of a k-th typed parameter of the parameters of the collected cores of the known gas-bearing shale reservoir A; $\bar{x}_i(A)$ and $\bar{x}_k(A)$ respectively represent an average value of the i-th typed parameter of the parameters of the collected cores of the known gas-bearing shale reservoir A and an average value of the k-th typed parameter of the parameters of the collected cores of the known gas-bearing shale reservoir A; $x_{ij}(B)$ represents a j-th value of an i-th typed parameter of the parameters of the collected cores of the known gas-bearing shale reservoir B; $x_{kj}(B)$ represents a j-th value of a k-th typed parameter of the parameters of the collected cores of the known gas-bearing shale reservoir B; $\bar{x}_i(B)$ and $\bar{x}_k(B)$ respectively represent an average value of the i-th typed parameter of the parameters of the collected cores of the known gas-bearing shale reservoir B and an average value of the k-th typed parameter of the parameters of the collected cores of the known gas-bearing shale reservoir B;

S5, establishing, according to the covariance value $s_{ik}$ obtained in the S4, the following equation group (5), and resolving discriminant coefficients $c_1, c_1, \ldots, c_m$ based on the equation group (5):

$$\begin{cases} s_{11}c_1 + s_{12}c_2 + s_{13}c_3 + \ldots + s_{1m}c_m = d_1 \\ s_{21}c_1 + s_{22}c_2 + s_{23}c_3 + \ldots + s_{2m}c_m = d_2 \\ s_{31}c_1 + s_{32}c_2 + s_{33}c_3 + \ldots + s_{3m}c_m = d_3 \\ \quad \cdots \cdots \\ s_{m1}c_1 + s_{m2}c_2 + s_{m3}c_3 + \ldots + s_{mm}c_m = d_m \end{cases} \quad (5)$$

S6, establishing a discriminant equation according to the obtained discriminant coefficients, the discriminant equation is expressed as follows in a formula (6);

$$Y = c_1 x_1 + c_2 x_2 + \ldots + c_m x_m \quad (6),$$

where $x_1, x_2, \ldots, x_m$ represent values of parameters of a corresponding core, and Y represents a discriminant value of the corresponding core; and solving, according to the following formula (7), a discriminant index $Y_c$ for discriminating a reservoir to which the unknown shale reservoir belongs:

$$Y_c = \frac{n_a \bar{Y}(A) + n_b \bar{Y}(B)}{n_a + n_b}, \quad (7)$$

where $\bar{Y}(A)$ and $\bar{Y}(B)$ represent an average discriminant value of the known gas-bearing shale reservoir A and an average discriminant value of the known water-bearing shale reservoir B, respectively, which are calculated according to the formula (6); and formulas for calculating $\bar{Y}(A)$ and $\bar{Y}(B)$ are as follows:

$$\bar{Y}(A) = c_1 \bar{x}_1(A) + c_2 \bar{x}_2(A) + c_3 \bar{x}_3(A) + \ldots + c_m \bar{x}_m \quad (A)$$

$$\bar{Y}(B) = c_1 \bar{x}_1(B) + c_2 \bar{x}_2(B) + c_3 \bar{x}_3(B) + \ldots + c_m \bar{x}_m \quad (B),$$

where $\bar{x}_m(A)$ represents an average value of an m-th typed parameter of the parameters of the collected cores of the known gas-bearing shale reservoir A, and $\bar{x}_m(B)$ represents an average value of an m-th typed parameter of the parameter of the collected cores of the known water-bearing shale reservoir B, which are calculated in the S2; and S7, obtaining values of relevant parameters of cores of a sample X of the unknown shale reservoir, wherein the relevant parameters comprise a core porosity Φ, a core permeability K and a gas saturation $S_g$; substituting the values of the relevant parameters into the formula (6) to calculate a discriminant value Y of a corresponding core of the cores of the sample X of the unknown shale reservoir; and in a situation of $Y \geq Y_c$, determining that the unknown reservoir belongs to a gas-bearing shale reservoir, or in a situation of $Y < Y_c$, determining that the unknown reservoir belongs to a water-bearing shale reservoir.

2. The analysis method for determining the gas-bearing situation of the unknown shale reservoir as claimed in claim 1, wherein the S6 further comprises: after solving the discriminant index Y', for discriminating a reservoir to which the unknown shale reservoir belongs, verifying whether the discriminant index Ye is accurate based on the known gas-bearing shale reservoir A and the known water-bearing shale reservoir B.

3. The analysis method for determining the gas-bearing situation of the unknown shale reservoir as claimed in claim 1, wherein in S1, the obtained values of the parameters of each of the collected cores of each of the known gas-bearing shale reservoir A and the known water-bearing shale reservoir B are values of the core porosity $\Phi$, the core permeability K, and the gas saturation $S_g$.

4. The analysis method for determining the gas-bearing situation of the unknown shale reservoir as claimed in claim 3, wherein each of the parameters of the collected cores of each of the known gas-bearing shale reservoir A and the known water-bearing shale reservoir B has at least five different values.

* * * * *